Nov. 8, 1927.   H. W. FISHER   1,648,641
ELECTRIC CABLE
Filed Jan. 27, 1927
FIG. I.
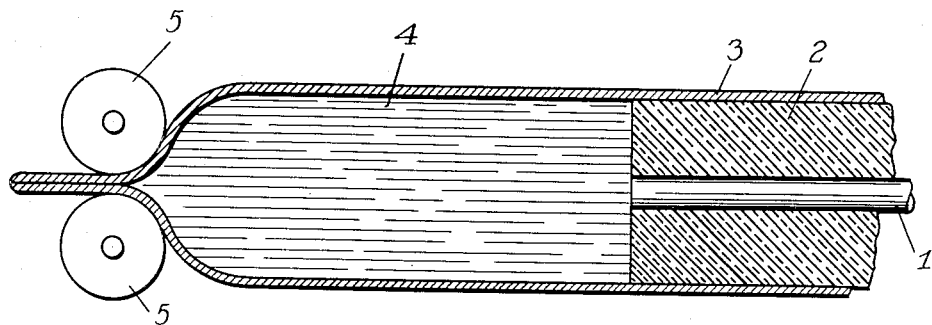
FIG. II.
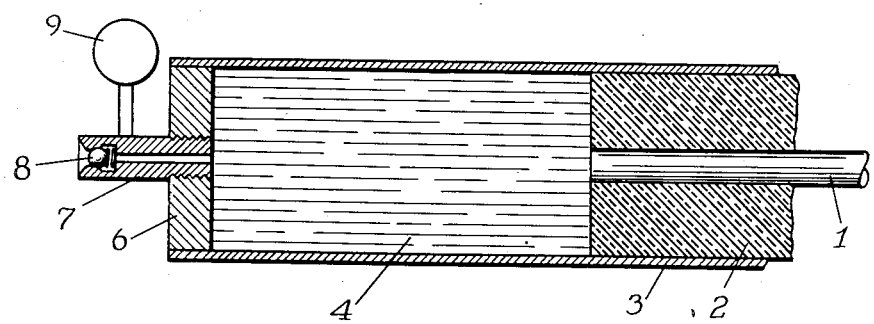
INVENTOR
Henry W. Fisher
by Christy and Christy
his attorneys Patented Nov. 8, 1927.

1,648,641

UNITED STATES PATENT OFFICE.

HENRY W. FISHER, OF PERTH AMBOY, NEW JERSEY, ASSIGNOR TO STANDARD UNDERGROUND CABLE COMPANY, OF PITTSBURGH, PENNSYLVANIA, A CORPORATION OF PENNSYLVANIA.

ELECTRIC CABLE.

Application filed January 27, 1927. Serial No. 163,845.

My invention relates to the building of electric cables, and consists both in a structure and in a method of procedure, whereby a cable of superior quality is obtained. The invention concerns particularly cables whose insulation consists of or includes a substance which under conditions of cable-building is fluid, and such a cable is typically a cable whose conductor or conductors are enveloped in wrapped-on paper (it may be other porous material, cambric, for instance), the paper being impregnated and saturated with insulating compound, which may be essentially a petroleum oil.

In the accompanying drawing Fig. I shows diagrammatically and in longitudinal section a cable-end prepared in accordance with and adapted to the realization of my invention; Fig. II is a similar view, illustrating an alternative structure adapted to the same end.

When in the course of cable making the cable body, consisting essentially of the insulation-enveloped conductor or conductors, goes through the lead press to receive its sheath of lead, the lead is necessarily warm. Indeed, as the sheathed (and finished) cable comes from the press, it is quite hot. As it comes from the press the cable is as a matter of convenience wound on a reel. The ends of a length of cable are not in usual practice sealed, until the cable has cooled approximately to room temperature. In the cooling of the cable there is necessarily some contraction of the insulating compound within the cable structure. The ends of the length of cable being open, the cooling cable is, because of the contraction of the body of fluid insulation within it, liable to absorb air. If, to prevent such absorption, the ends of the length of cable were closed before cooling, then the effect of contraction of the fluid insulation would be likely to be the opening of void spaces within the body of the cable. The presence of spaces within the body of the cable, whether filled with air or void, is of course undesirable.

According to my invention as it is illustrated in Fig. I, when about to sheath a length of cable body in lead, I first shoot a few feet of lead through the lead press, forming thus an open pipe of lead. This open pipe I seal at the outer end. I then fill the pipe with compound, and then I introduce the end of the cable body into the lead press and proceed with the operation of sheathing the cable in the usual manner. When the length of cable has been sheathed throughout, the sheath may be prolonged somewhat beyond the end of the cable body, and the pipe so formed may be filled with compound and then closed.

Fig. I shows diagrammatically a single-conductor cable including a conductor 1, and envelope of insulation 2, which may be understood to be wrapped-on paper filled with insulating compound, and a lead sheath 3. The lead sheath is prolonged beyond the end of the cable body in a pipe-like extension, closed at the remote end and filled with a body 4 of insulating compound. While the cable is being sheathed in lead, pressure is maintained upon the liquid which fills the body of insulation 2, and means may be provided for cooling the still unsheathed portion of the cable body.

The cable, being formed in the manner described, it becomes possible to reduce the volume of the contents of the cable sheath, in accordance with the thermal contraction of such contents. Any convenient compression or constriction affording device or expedient may be resorted to. By way of example, I have in the accompanying drawing indicated a pair of rolls 5. These rolls may be mounted in housings to define a roll-pass of a width equal to twice the thickness of the cable sheath, or more. This pair of rolls is caused to engage the extension of the cable, in the manner shown, and as cooling progresses the rolls are caused to advance upon and to crush the cable-end. Such advance of the rolls upon the cable-end (or such advance of the cable-end into the roll pass) will progress slowly, and, as a matter of practice may be continuous or intermittent.

Turning now to Fig. II, an alternative structure is shown, adapted to accomplish the same general ends as in Fig. I are accomplished by the rolls 5, operating in the manner described. After the forward end of the cable has passed through the lead press it is swung to vertical position, the oil-filled terminal portion is cut off square near the tip, and a plug 6 is soldered to place in the cut off end. This plug, otherwise closing the cable end, is perforate, and in the perforation is set a connection 7 for an alemite grease gun, or its equivalent. Within the connection is arranged an outwardly closing check valve, conveniently in the form of a ball valve 8. The connection may carry a pressure gauge 9 also. While the connection 7 is being screwed to place in the plug 6, a fine wire thrust in through the outer end of the connection may hold the valve unseated, and the connection may be screwed inward until oil comes out through the outer end. Thus the complete filling of the connection with oil may be insured.

The grease gun provided with the usual flexible hose is filled with oil, and before applying it, oil is forced out through the hose, and when the connecting parts are thus flushed with oil, the gun is attached to connection 7. The gun is then operated, until the pressure exerted upon the body of oil, indicated upon gauge 9, reaches a certain value. It will ordinarily then be convenient to take the grease gun away, and to secure the cable end with the pressure gauge connected to it as indicated in Fig. II, to the reel upon which the cable as it comes from the lead press is progressively wound. When in the progress of sheathing, and as the finished portion of the cable increases in length and grows cold, the reading of the gauge will indicate shrinkage of the body of liquid within. The lead press may then be stopped and the grease gun may again be connected and the deficiency of oil may be made good and pressure may again be built up within the cable to the desired point. The gun may then again be taken away and the operation of sheathing be recommenced.

As soon as the entire length of cable has been lead covered, its last completed end may similarly be provided with a reservoir of oil closed with a similar plug, and through that plug also a grease gun may be connected, and by the operation of the guns shrinkage of the oil incident to cooling may be made good.

In order to hasten the cooling operation water may be caused to stream over the cable as it comes from the lead press, and of course when the cable has cooled to normal temperature it is no longer necessary to force in oil nor to apply pressure.

The liquid which fills the terminal prolongation of the cable sheath (and the grease gun, if the apparatus of Fig. II be employed), though ordinarily the same insulating compound which fills the insulating envelope of the cable, need not be the same. It will be a liquid such in character as to lend itself to the operation described, and at the same time a liquid which, being brought into immediate contact with the cable insulation, has no injurious effect upon that insulation; and a liquid which, to the extent that it enters into and becomes part of the cable insulation, itself possesses adequate insulating properties.

I have shown, by way of example merely, a single-conductor cable, and a cable whose conductor is enveloped in wrapped-on insulation. Manifestly, the invention is applicable to any fluid-containing, lead-sheathed cable, whether single-conductor or multi-conductor.

I claim as my invention:

1. The method herein described of maintaining the integrity of a body of fluid insulation within a sheathed cable as it comes hot from the lead press which consists in exerting pressure upon a body of fluid insulation within a terminal prolongation of the cable sheath.

2. The method herein described of preventing flaws in the fluid containing insulation of a cable while cooling which consists in maintaining pressure upon a body of fluid insulation within a terminal prolongation of the cable sheath while cooling is in progress.

3. A cable length including conductor, fluid-containing insulation envelope, and lead sheath, the sheath being prolonged as a closed sack beyond the end of the insulating envelope and the sack so formed being filled with fluid insulation.

In testimony whereof I have hereunto set my hand.

HENRY W. FISHER.